(12) United States Patent
Chu et al.

(10) Patent No.: US 10,631,187 B1
(45) Date of Patent: Apr. 21, 2020

(54) METHOD AND APPARATUS FOR RANGING

(71) Applicant: Marvell International Ltd., Hamilton (BM)

(72) Inventors: Liwen Chu, San Ramon, CA (US); Sagar A. Tamhane, Fremont, CA (US); Christian R. Berger, San Jose, CA (US); Niranjan Grandhe, San Jose, CA (US); Hongyuan Zhang, Fremont, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 232 days.

(21) Appl. No.: 15/691,268

(22) Filed: Aug. 30, 2017

Related U.S. Application Data

(60) Provisional application No. 62/381,173, filed on Aug. 30, 2016.

(51) Int. Cl.
| H04L 12/26 | (2006.01) |
| H04W 24/10 | (2009.01) |
| H04B 1/40 | (2015.01) |
| H04W 84/12 | (2009.01) |

(52) U.S. Cl.
CPC .............. *H04W 24/10* (2013.01); *H04B 1/40* (2013.01); *H04L 43/0864* (2013.01); *H04W 84/12* (2013.01)

(58) Field of Classification Search
None
See application file for complete search history.

(56) References Cited

U.S. PATENT DOCUMENTS

| 9,749,958 | B1* | 8/2017 | Segev | H04W 52/0235 |
| 10,009,430 | B2* | 6/2018 | Eyal | H04L 67/18 |
| 2015/0139212 | A1* | 5/2015 | Wang | G01S 5/06 370/338 |
| 2016/0014805 | A1* | 1/2016 | Merlin | H04W 56/0005 370/345 |
| 2016/0029330 | A1* | 1/2016 | Siomina | H04W 56/0055 370/328 |
| 2016/0205580 | A1* | 7/2016 | Pragada | H04W 16/14 370/252 |
| 2016/0366548 | A1* | 12/2016 | Wang | G01S 13/825 |
| 2017/0041750 | A1* | 2/2017 | Jose | G01S 5/0205 |
| 2017/0180917 | A1* | 6/2017 | Steiner | G01S 13/765 |
| 2017/0180933 | A1* | 6/2017 | Steiner | H04W 4/023 |
| 2018/0054794 | A1* | 2/2018 | Cariou | H04W 64/00 |
| 2018/0295601 | A1* | 10/2018 | Wang | H04B 7/06 |
| 2019/0029052 | A1* | 1/2019 | Yang | H04L 1/18 |
| 2019/0059014 | A1* | 2/2019 | Sanderovich | H04W 24/10 |

* cited by examiner

*Primary Examiner* — Phirin Sam

(57) ABSTRACT

Aspects of the disclosure provide an apparatus that includes a transceiver circuit and a processing circuit. The transceiver circuit is configured to transmit and receive wireless signals. The processing circuit is configured to generate a request frame using an extended control frame format to indicate an enhanced fine timing measurement (EFTM) based range measurement to a second apparatus, cause the transceiver circuit to transmit, when a transmission opportunity (TXOP) is granted to the apparatus, wireless signals carrying the request frame to start the EFTM based range measurement that exchanges null data packets with the second apparatus, and determine a round trip time based on departure and arrival timing information of the null data packets.

23 Claims, 6 Drawing Sheets

METHOD AND APPARATUS FOR RANGING

INCORPORATION BY REFERENCE

This present disclosure claims the benefit of U.S. Provisional Application No. 62/381,173, "RANGING WITHIN ONE TXOP" filed on Aug. 30, 2016, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless local area network (WLAN) is used in home, school, office building, store, shopping mall and the like to link two or more devices using wireless connections within a limited area to a network. The WLAN allows users to move around within the limited area and still be connected to the network. In addition, the WLAN can be configured to provide connections to other networks, such as, a wide area network, Internet and the like. Generally, WLANs are implemented based on standards, such as IEEE 802.11 standards, and the like.

SUMMARY

Aspects of the disclosure provide an apparatus that includes a transceiver circuit and a processing circuit. The transceiver circuit is configured to transmit and receive wireless signals. The processing circuit is configured to generate a request frame using an extended control frame format to indicate an enhanced fine timing measurement (EFTM) based range measurement to a second apparatus, cause the transceiver circuit to transmit, when a transmission opportunity (TXOP) is granted to the apparatus, wireless signals carrying the request frame to start the EFTM based range measurement that exchanges null data packets with the second apparatus, and determine a round trip time based on departure and arrival timing information of the null data packets.

In an embodiment, the processing circuit is configured to receive a report frame sent by the second apparatus, extract from the report packet a departure time of a first null data packet and an arrival time of a second null data packet that are recorded by the second apparatus, and determine the round trip time based on an arrival time of the first null data packet and a departure time of the second null data packet that are recorded by the apparatus and the departure time of the first null data packet and the arrival time of the second null data packet.

According to an aspect of the disclosure, the processing circuit is configured to generate the request frame that includes at least one of a dialog token for the EFTM based range measurement, a bandwidth of the TXOP, a type indicator of null data packet, an indicator of feedback type, and channel state parameters.

In an example, the transceiver is configured to receive wireless signals carrying a response frame in response to the request frame and the processing circuit is configured to detect a capability indicator for the EFTM based range measurement from the response frame.

In an example, the processing circuit is configured to generate the request frame to indicate a data rate and/or modulation and coding scheme for the second apparatus to use.

Aspects of the disclosure provide an apparatus including a transceiver circuit and a processing circuit. The transceiver circuit is configured to transmit and receive wireless signals that carry frames. The processing circuit is configured to parse a request frame received by the transceiver circuit. The request frame has an extended control frame format and is configured to indicate an enhanced fine timing measurement (EFTM) based range measurement within a transmission opportunity (TXOP) that is initiated from a second apparatus. The processing circuit is configured to record a departure time of a first null data packet that is transmitted by the transceiver circuit and an arrival time of a second null data packet that is received by the transceiver circuit, generate a report frame to include the departure time of the first null data packet and the arrival time of the second null data packet, and cause the transceiver circuit to transmit the report frame to the second apparatus for the second apparatus to determine a round trip time based on the departure time of the first null data packet and the arrival time of the second null data packet.

According to an aspect of the disclosure, the processing circuit is configured to generate a response frame in response to the request frame, and the response frame includes a capacity indicator for the EFTM based range measurement. In an embodiment, the processing circuit is configure to determine that a medium for the EFTM based range measurement is idle before causing the transceiver circuit to transmit wireless signals for the EFTM based range measurement. In another embodiment, the processing circuit is configured to cause the transceiver circuit to transmit wireless signals for the EFTM based range measurement without a medium idle detection.

In an example, the processing circuit is configured to determine a bandwidth, a data rate, a modulation and coding scheme (MCS), and a data unit format for the report frame according to an indicator in the request frame. In another example, the processing circuit is configured to determine a bandwidth, a data rate, a modulation and coding scheme (MCS), and a data unit format for the report frame according to that is used for the request frame. In another example, the processing circuit is configured to determine a bandwidth, a data rate, a modulation and coding scheme (MCS), and a data unit format for the report frame independent of the request frame.

Aspects of the disclosure provide a method for ranging. The method includes generating, by an electronic device, a request frame using an extended control frame format to indicate an enhanced fine timing measurement (EFTM) based range measurement to a second electronic device, transmitting, when a transmission opportunity (TXOP) is granted to the electronic device, wireless signals carrying the request frame to start the EFTM based range measurement that exchanges null data packets with the second electronic device, and determining a round trip time based on departure and arrival timing information of the null data packets.

Aspects of the disclosure provide a method for ranging. The method includes receiving, at an electronic device, wireless signals carrying a frame from a second electronic device, parsing the frame to identify an extended control frame format of the frame and an indication of an enhanced fine timing measurement (EFTM) based range measurement within a transmission opportunity (TXOP) that is initiated from the second electronic device, recording a departure time of a first null data packet that is transmitted by the electronic device and an arrival time of a second null data packet that is received by the electronic device, generating a report frame to include the departure time of the first null data packet and the arrival time of the second null data packet and transmitting the report frame to the second electronic device for the second electronic device to determine a round trip time based on the departure time of the first null data packet and the arrival time of the second null data packet.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1A:
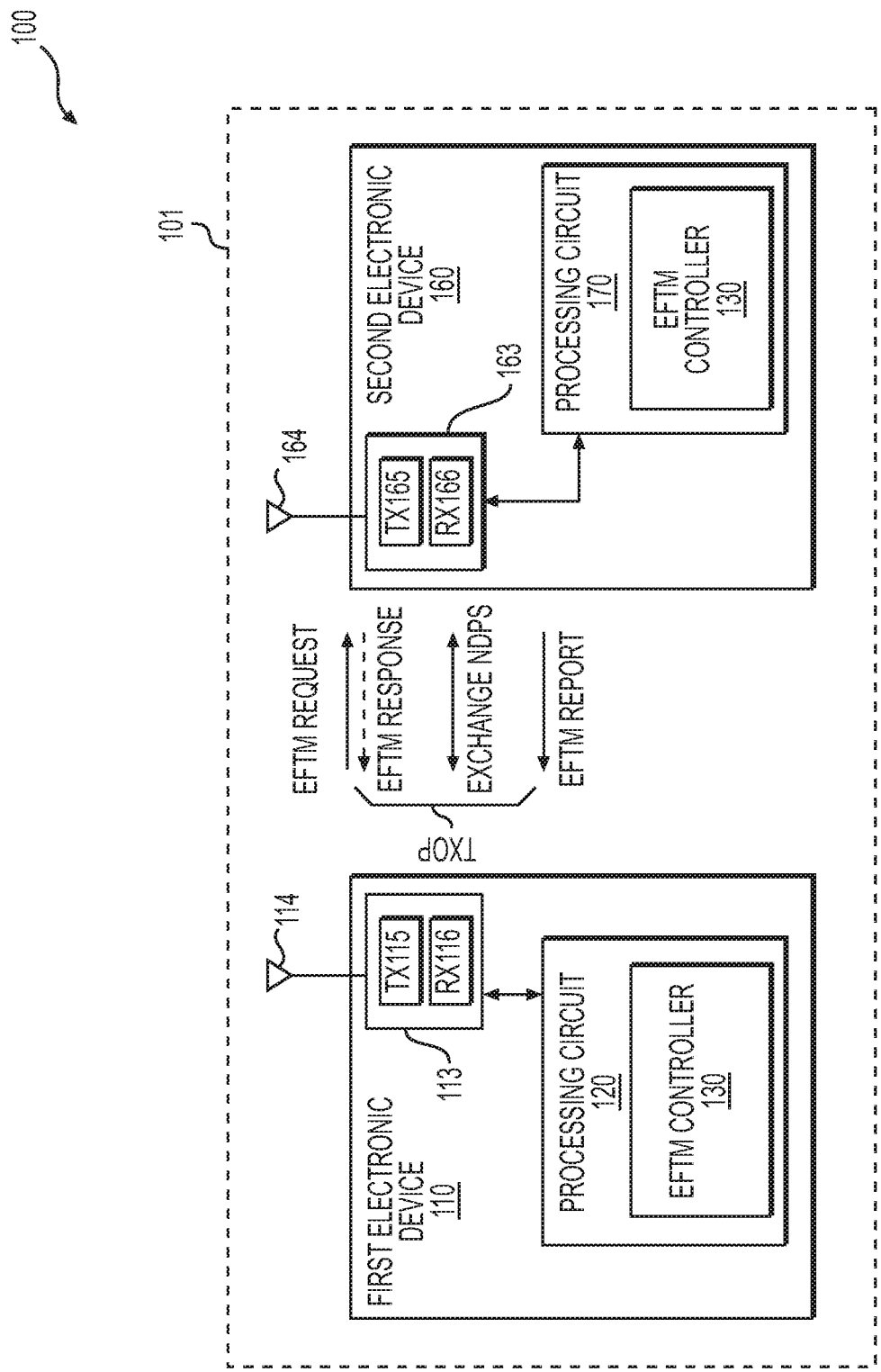
FIG. 1A shows a block diagram of a network system 100 according to an embodiment of the disclosure.

FIG. 1A shows a block diagram of a network system 100 according to an embodiment of the disclosure. The network system 100 includes a plurality of electronic devices, such as a first electronic device 110, a second electronic device 160, and the like, in wireless communication. According to an aspect of the disclosure, at least two devices, such as the first electronic device 110 and the second electronic device 160 are configured to exchange signals in a transmit opportunity (TXOP) to perform range measurement.

The network system 100 includes interconnections that are implemented using any suitable network technology, such wired, wireless, a local area network (LAN), a wireless LAN (WLAN), a cellular network, a fiber optical network, a wide area network (WAN), a peer-to-peer network, the Internet, and the like. In an example, the plurality of electronic devices are in a basic service set (BSS) 101 that is implemented using WLAN technology to interconnect, for example, the first electronic device 110 with the second electronic device 160. In an example, the network system 100 includes other suitable interconnections (not shown), such as a LAN, a fiber optical network, and the like to provide connections for the BSS 101 to be connected to for example Internet.

It is noted that, in another example, the plurality of electronic devices use other suitable wireless technology, such as cellular network technology for communication.

In an embodiment, the BSS 101 is an infrastructure type basic service set. In an example, the electronic devices include one or more access point (AP) devices and one or more station (STA) devices. AP devices include network hardware and software configured to serve as a bridge to allow wireless compliant devices, such as the STA devices to connect to other part of the network system 100. In an example, the first electronic device 110 is an STA device, and the second electronic device 160 is an AP device. In another example, the second electronic device 160 is an STA device, and the first electronic device 110 is an AP device. In another embodiment, both the first electronic device 110 and the second electronic device 160 are STA devices.

The first electronic device 110 and the second electronic device 160 can be any suitable device, such as a desktop computer, a laptop computer, a tablet computer, a smart phone, a personal digital assistant (PDA), a smart watch, a smart camera, a smart TV, a smart voice recorder, a wearable device, a sensor device, an actuator device, a plug-in device for a home appliance, a home appliance, a locker, a light bulb, a power switch, a modem, a router, and the like.

According to an aspect of the disclosure, some electronic devices in the network system 100, such as the first electronic device 110 and the second electronic device 160, are configured to support enhanced fine timing measurement (EFTM) technology. In an embodiment, two electronic devices that support EFTM technology can communicate with each other to perform an EFTM based range measurement within one TXOP. Based on the EFTM based range measurement, in an example, a round trip time (RTT) is determined. The RTT can be used to determine a distance between the two electronic devices, and is useful in various location and/or navigation related applications.

In the FIG. 1A example, the first electronic device 110 is an initiating device and the second electronic device 160 is a responding device. In an example, within a TXOP, the first electronic device 110 sends an EFTM request frame (e.g., transmit a wireless signal carrying the EFTM request frame) to the second electronic device 160 to start the range measurement. Then the first electronic device 110 and the second electronic device 160 exchange a sequence of null data packets (NDPs) (e.g., transmit/receive wireless signals carrying null data packets). The first electronic device 110 and the second electronic device 160 record a time of departure (TOD) and a time of arrival (TOA) for each of the NDPs. Then, one of the electronic devices, such as the second electronic device 160, sends an EFTM report frame (e.g., transmit a wireless signal carrying the EFTM report frame) to the other electronic device, such as the first electronic device 110. The EFTM report frame includes the recorded timestamps for the NDPs at the second electronic device 160. Then the first electronic device 110 determines an air time, such as a round trip time (RTT), of the NDPs based on the TOD and TOA of the NDPs.

For example, when the first electronic device 110 transmits a first NDP to the second electronic device 160, the first electronic device 110 records a first TOD (TOD1) that is the timestamp of the transmission according to a clock in the first electronic device 110. When the second electronic device 160 receives the first NDP, the second electronic device 160 records a first TOA (TOA1) that is the timestamp of the reception according to a clock in the second electronic device 160. When the second electronic device 160 transmits a second NDP to the first electronic device 110, the second electronic device 160 records a second TOD (TOD2) that is the timestamp of the transmission according to the clock in the second electronic device 160. When the first electronic device 110 receives the second NDP, the first electronic device 110 records a second TOA (TOA2) that is the timestamp of the reception according to the clock in the first electronic device 110. When the first electronic device 110 receives TOA1 and TOD2 from the second electronic device 160, the first electronic device 110 calculates the RTT as a sum of (TOA1-TOD1) and (TOA2-TOD2) in an example. In the example, the clock discrepancy of the first electronic device 110 and the second electronic device 160 is cancelled out.

It is noted that, in another example, the second electronic device 160 sends the first NDP, and the first electronic device 110 sends the second NDP. In an example, the first NDP and the second NDP are separated by a short interframe space (SIFS).

In an embodiment, the first electronic device 110 has the knowledge that the second electronic device 160 supports the EFTM before starting the EFTM based range measurement. For example, the second electronic device 160 is an AP device, and periodically transmits a beacon signal that is configured to indicate EFTM capability. In another example, the first electronic device 110 sends a probe request signal to request EFTM capability information. In response to the probe request signal, the second electronic device 160 sends a probe response signal to report the EFTM capability. In the embodiment, after the first electronic device 110 learns that the second electronic device 160 supports EFTM, the first electronic device 110 starts the EFTM based range measurement.

In another embodiment, the first electronic device 110 has no knowledge whether the second electronic device 160 supports the EFTM technology before starting the EFTM based range measurement. In the embodiment, the first electronic device 110 sends an EFTM request frame to the second electronic device 160. The EFTM request frame indicates that the first electronic device 110 supports EFTM technology, and starts an EFTM based range measurement with the second electronic device 160. When the second electronic device 160 also supports the EFTM technology, the second electronic device 160 transmits an EFTM response frame. The EFTM response frame indicates that the second electronic device 160 supports EFTM technology. Then, the second electronic device 160 operates cooperatively with the first electronic device 110 to continue the EFTM based range measurement.

Figure 1B:
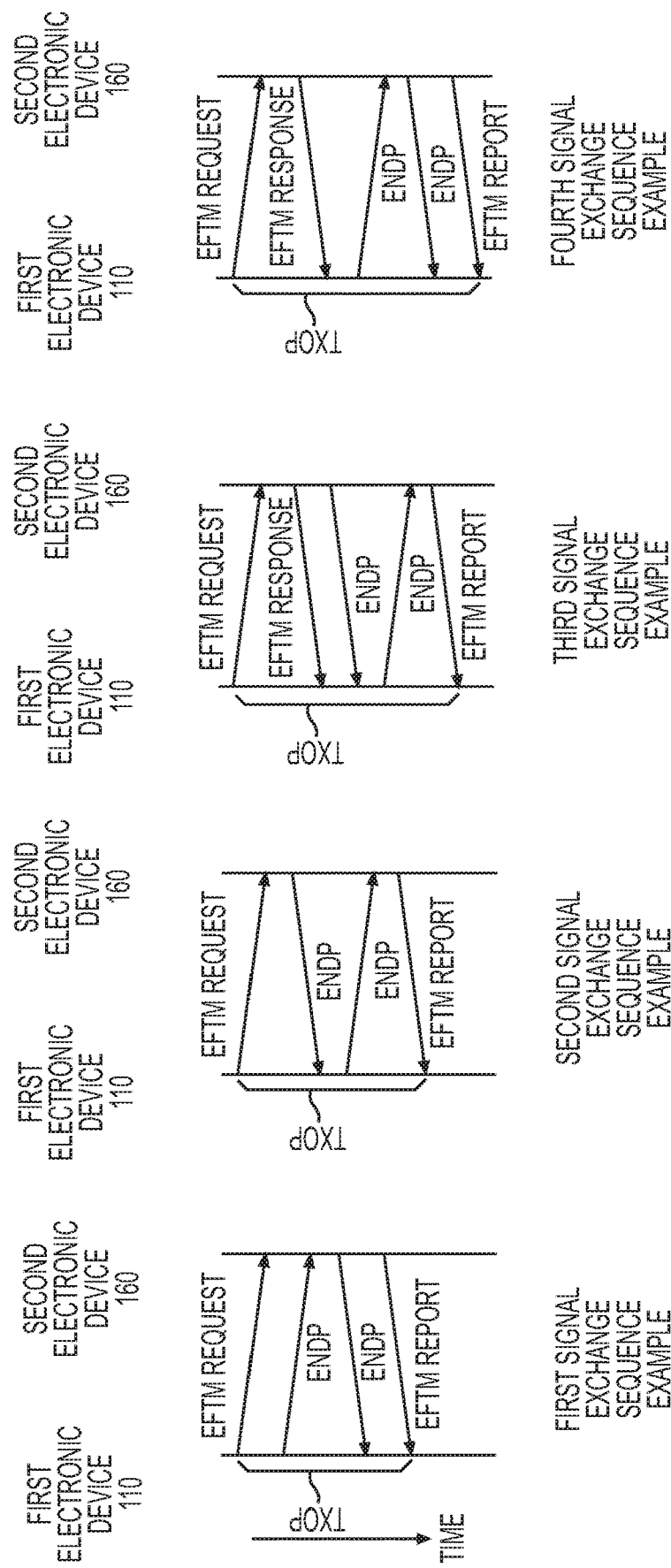
FIG. 1B shows examples of signal exchange sequences in the network system 100 according to embodiments of the disclosure.

FIG. 1B shows four signal exchange sequence examples in the network system 100 according to embodiments of the disclosure.

In the first signal exchange sequence example, within a TXOP, the first electronic device 110 sends an EFTM request frame to the second electronic device 160 to start the range measurement. Then the first electronic device 110 sends a first enhanced NDP (ENDP). When the second electronic device 160 receives the first ENDP, the second electronic device 160 sends a second ENDP. Further, the second electronic device 160 sends an EFTM report frame to the first electronic device 110 to report, for example, the TOA of the first ENDP and the TOD of the second ENDP.

In the second signal exchange sequence example, within a TXOP, the first electronic device 110 sends an EFTM request frame to the second electronic device 160 to start the range measurement. When the second electronic device 160 receives the EFTM request frame, the second electronic device 160 sends a first ENDP. When the first electronic device 110 receives the first ENDP, the first electronic device 110 sends a second ENDP. When the second electronic device 160 receives the second ENDP, the second electronic device 160 sends an EFTM report frame to the first electronic device 110 to report, for example, the TOD of the first ENDP and the TOA of the second ENDP.

In the first and second signal exchange sequence examples, the first electronic device 110 has the knowledge that the second electronic device 160 has EFTM capability before starting the range measurement in an example.

In the third signal exchange sequence example, within a TXOP, the first electronic device 110 sends an EFTM request frame to the second electronic device 160 to start the range measurement. When the second electronic device 160 receives the EFTM request frame, the second electronic device 160 sends an EFTM response frame. The EFTM response frame indicates that the second electronic device 160 supports EFTM technology. Further, the second electronic device sends a first ENDP. When the first electronic device 110 receives the first ENDP, the first electronic device 110 sends a second ENDP. When the second electronic device 160 receives the second ENDP, the second electronic device 160 sends an EFTM report frame to the first electronic device 110 to report, for example, the TOD of the first ENDP and the TOA of the second ENDP.

In the fourth signal exchange sequence example, within a TXOP, the first electronic device 110 sends an EFTM request frame to the second electronic device 160 to start the range measurement. When the second electronic device 160 receives the EFTM request frame, the second electronic device 160 sends an EFTM response frame. The EFTM response frame indicates that the second electronic device 160 supports EFTM technology. When the first electronic device 110 receives the EFTM response frame, the first electronic device 110 sends a first ENDP. When the second electronic device 160 receives the first ENDP, the second electronic device 160 sends a second ENDP. Further, the second electronic device 160 sends an EFTM report frame to the first electronic device 110 to report, for example, the TOA of the first ENDP and the TOD of the second ENDP.

In the third and fourth signal exchange sequence examples, the first electronic device 110 has no knowledge whether the second electronic device 160 supports the EFTM technology before starting the EFTM based range measurement in an example. The EFTM request frame and the EFTM response frame are used to inform each other the EFTM capability. For example, the first electronic device 110 sends an EFTM request frame to the second electronic device 160. The EFTM request frame indicates that the first electronic device 110 supports EFTM technology, and starts an EFTM based range measurement with the second electronic device 160. When the second electronic device 160 also supports the EFTM technology, the second electronic device 160 transmits an EFTM response frame. The EFTM response frame indicates that the second electronic device 160 supports EFTM technology. Then, the second electronic device 160 operates cooperatively with the first electronic device 110 to continue the EFTM based range measurement.

Figure 2:
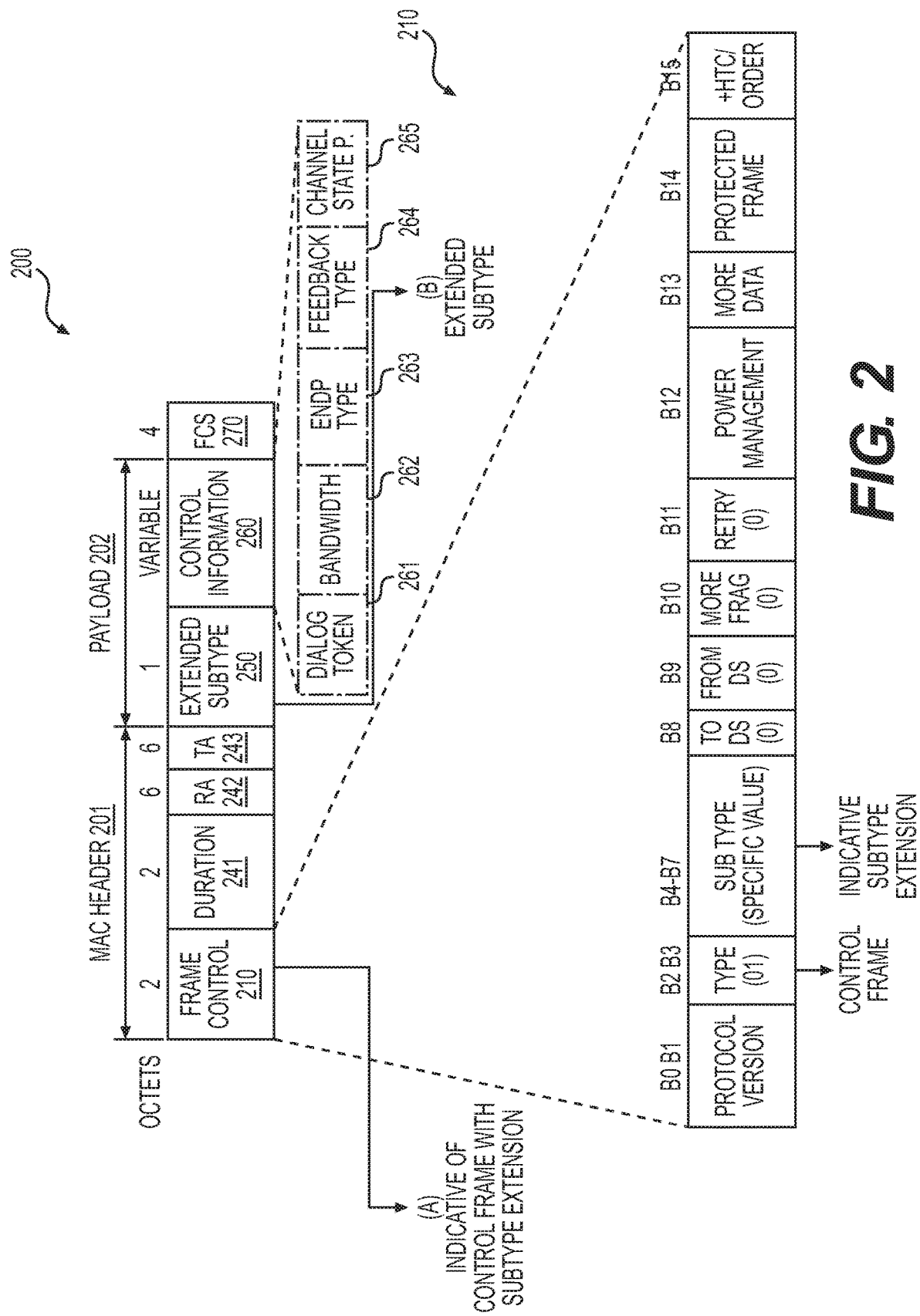
FIG. 2 shows an example of an extended control frame format according to an embodiment of the disclosure.

According to an aspect of the disclosure, the EFTM request frame and the EFTM response frame are control frames. In an example, the EFTM report frame is also a control frame. In another example, the EFTM report frame is a management frame. In an embodiment, control frames are configured to use extended control frame format to carry EFTM related control information. An example of extended control frame format is shown in FIG. 2, and will be discussed in detail with reference to FIG. 2.

Further, in an example, the enhanced null data packet is configured to provide more accurate channel estimation. Generally, a null data packet includes a physical layer preamble portion, and does not have MAC header and data payload. In an example, the enhanced null data packet is a null data packet with a relatively longer long training field (LTF) for synchronization and initial channel estimation. Thus, the long training field can carry a relatively large number of symbols, and can enable relatively more accurate synchronization and channel estimation. In another example, the enhanced null data packet (ENDP) is high efficiency (HE) NDP or very high throughput (VHT) NDP.

In the FIG. 1A example, the first electronic device 110 includes a transceiver circuit 113 and a processing circuit 120 coupled together as shown in FIG. 1A. In the example, the transceiver circuit 113 includes a receiving circuit (RX) 116 and a transmitting circuit (TX) 115 that are both coupled to an antenna 114. The processing circuit 120 includes an EFTM controller 130 configured to enable the first electronic device 110 to operate based on the EFTM technology, and to perform EFTM based range measurement.

The transceiver circuit 113 is configured to receive and transmit wireless signals. For example, the receiving circuit 116 is configured to generate electrical signals in response to captured electromagnetic waves by the antenna 114, and process the electrical signals to extract digital streams (e.g., frames) from the electrical signals. In an example, the transmitting circuit 115 is configured to receive digital streams, such as control frames, management frames, data frames, and the like from for example the processing circuit 120, generate radio frequency (RF) signals to carry the digital streams, and emit electromagnetic waves in the air via the antenna 114 to transmit wireless signals that carry the digital streams.

Similarly, the second electronic device 160 includes a transceiver circuit 163 and a processing circuit 170 coupled together. The transceiver circuit 163 includes a transmitting circuit 165 and a receiving circuit 166 that are both coupled to an antenna 164. The processing circuit 170 includes an EFTM controller 190 configured to enable the first electronic device 110 to operate based on the EFTM technology, and to perform EFTM based range measurement.

The transceiver circuit 163 is configured to receive and transmit wireless signals. For example, the receiving circuit 166 is configured to generate electrical signals in response to captured electromagnetic waves by the antenna 164, process the electrical signals to extract digital streams (e.g., frames) from the electrical signals and provide the digital streams to the processing circuit 170. In an example, the transmitting circuit 165 is configured to receive digital streams, such as control frames, management frames, data frames, and the like from for example the processing circuit 170, generate radio frequency (RF) signals to carry the digital streams, and emit electromagnetic waves in the air via the antenna 164 to transmit wireless signals that carry the digital streams.

The EFTM controller 130 and the EFTM controller 190 are similarly configured according to the EFTM technology. Specifically, the EFTM controller 130 and the EFTM controller 190 can enable the first electronic device 110 and the second electronic device 160 to exchange signals in the EFTM based range measurement. For example, the EFTM controller 130 and the EFTM controller 190 can enable the processing circuit 120 and the processing circuit 170 to generate frames for transmission for the EFTM based range measurement, such as EFTM request frame, EFTM response frame, EFTM report frame, and the like according to the EFTM technology, and process (e.g., parse and respond) received frames used in the EFTM based range measurement, according to the EFTM technology.

During operation, in an example, after a TXOP is granted to the first electronic device 110, the EFTM controller 130 generates an EFTM request frame using the extended control frame format to indicate the EFTM based range measurement. In an example, the EFTM controller 130 includes a subtype indicator, a dialog token, a bandwidth indicator, an ENDP type indicator, a feedback type indicator, channel state parameters and the like in the EFTM request frame. In an example, the subtype indicator has a value corresponding to the EFTM request subtype under the control type, and the dialog token includes a value identifying the present range measurement. Also in the example, the bandwidth indicator has a value corresponding to the bandwidth of the TXOP (e.g., the bandwidth for EFTM request frame, EFTM response frame, EFTM report frame, ENDP), the ENDP type indicator indicates requested type of ENDP, such as very high throughput (VHT) type according to VHT WLAN standard, high efficiency (HE) type according to HE WLAN standard, and the like. Further, in the example, the feedback type indicator defines the feedback type, such as timestamp feedback, channel state feedback and the like. The channel state parameters define the parameters of the channel state feedback. Additionally, in an example, the EFTM controller 130 includes a capability indicator for EFTM in the EFTM request frame. In an embodiment, the EFTM controller 130 includes a data rate/modulation coding scheme indicator in the EFTM request frame.

The transmitting circuit 115 transmits a wireless signal carrying the EFTM request frame to start the EFTM based range measurement.

In the example, when the second electronic device 160 receives the wireless signal carrying the EFTM request frame, the receiving circuit 166 constructs a frame in response to the wireless signal, and provides the frame to the processing circuit 170. In an example, the EFTM controller 190 detects that the frame is in the extended control frame format, and parses the frame accordingly. For example, the EFTM controller 190 detects a value in a subtype field that is indicative of the EFTM request subtype under the control type, thus the frame is an EFTM request frame. Further, the EFTM controller 190 extracts information from a control information field of the EFTM request frame, such as a dialog token, a bandwidth indicator, a feedback type indicator and the like. Additionally, in an example, the EFTM controller 190 extracts a data rate/modulation coding scheme indicator from the EFTM request frame.

In an embodiment, in response to the EFTM request frame, the second electronic device 160 sends an EFTM response frame or an ENDP. In another embodiment, the second electronic device 160 waits for an ENDP from the first electronic device 110, and then sends an ENDP.

In an embodiment, within the TXOP, the second electronic device 160 can respond to the EFTM request frame without considering whether a medium (e.g., communication channel) is busy or idle. In another embodiment, within the TXOP, before the second electronic device 160 sends an EFTM response frame or an ENDP, the second electronic device 160 detects whether the communication medium is idle. When the medium is idle, the second electronic device 160 sends the EFTM response frame or the ENDP frame. The second electronic device 160 can use any suitable technology to detect the busy/idle status of the medium. In an example, whether the medium is idle is based on both physical medium detection and virtual medium detection, where for the virtual medium detection, the second electronic device 120 checks network allocation vector (NAV) that represents amount of time to defer in accessing the medium. When the NAV has zero value, the second electronic device 120 determines that the medium is virtual idle. For the physical medium detection, the second electronic device 120 decides whether the medium is idle per the Wi-Fi Alliance (WFA) orthogonal frequency-division multiplexing (OFDM) symbol detection or energy detection.

In an embodiment, the EFTM controller 190 generates an EFTM response frame using the extended control frame format in response to the EFTM request frame, and uses the EFTM response frame to indicate an EFTM capability. In an example, the EFTM controller 190 includes a subtype indicator, a dialog token, a status indicator, an ENDP type indicator, a bandwidth indicator, a feedback type indicator, and channel state parameters in the EFTM response frame. In an example, the subtype indicator has a value corresponding to the EFTM response subtype under the control type, and the dialog token is copied from the EFTM request frame. Further, in the example, the status indicator is indicative of whether the second electronic device 160 accepts the request, or a reason of rejection. The bandwidth indicator has a value corresponding to a negotiated bandwidth of the TXOP, the ENDP type indicator indicates a negotiated type of ENDP, and the feedback type indicator defines a negotiated feedback type. The channel state parameters define the negotiated parameters of the channel state feedback.

In another embodiment, the EFTM controller 190 is configured to generate an EFTM report frame. The EFTM report frame can be control frame or management frame. In an example, the EFTM controller 190 copies the dialog token from the EFTM request frame, and include recorded departure time and arrival time of ENDPs at the second electronic device 160.

It is noted that the EFTM controller 130 and the EFTM controller 190 can be implemented using any suitable technique. In an example, an EFTM controller is implemented using circuits. In another example, an EFTM controller is implemented as a processor executing software instructions.

In an embodiment, the device which transmits the EFTM Report frame decides the bandwidth (BW), modulation coding schem(MCS)/data rate, physical layer convergence procedure (PLCP) protocol data unit (PPDU) format of PPDU which carries the EFTM Report frame. And the BW, MCS/data rate, PPDU format of EFTM Report frame can be different from the BW, MCS/data rate, PPDU format of EFTM Request frame. This simplifies the design when the EFTM Report is prepared by hardware.

In another embodiment, the device uses the same BW, MCS/data rate, PPDU format to transmit EFTM Report frame as the PPDU which carries the EFTM Request.

In one embodiment, the interframe spaces between one PPDU and the following PPDU are all short interframe space (SIFS). In one embodiment, when the frame exchange is not successful, e.g. when EFTP Report is not received correctly or when the second NDP is not received correctly, the same frame exchange is done again.

FIG. 2 shows a frame 200 in an extended control frame format with subtype extension according to an embodiment of the disclosure. In the FIG. 2 example, the frame 200 includes a MAC header 201, a payload 202 and a frame check sequence (FCS) 270. In the FIG. 2 example, the frame 200 is a control frame with an extended subtype, and the subtype of the control frame is indicated by an extended subtype field in the payload 202.

The MAC header 201 includes a frame control field 210, a duration field 241, a receiver address field 242, and a transmitter address field 243. In an example, the frame control field 210 occupies two octets (two bytes), the duration field 241 occupies two octets (two bytes), the receiver address (RA) field 242 occupies six octets (six bytes), and the transmitter address (TA) field 243 occupies six octets (six bytes). In the FIG. 2 example, the frame control field 210 indicates that the frame 200 is a control frame, and the frame control field 210 also indicates that the extended control frame format is used to indicate the extended subtype of the control frame. When the extended control frame format is used, the payload 202 includes an extended subtype field 250. In an example, the extended subtype field 250 occupies one octet. It is noted that the extended subtype field 250 can have other suitable length. In an example, the payload 202 also includes a control information field 260.

The frame control field 210 has 16 bits B0-B15, and the 16 bits form a plurality of fields that are subfields for the frame control field 210. For example, bits B0-B1 forms a protocol version field, bits B2-B3 forms a type field, B4-B7 form a subtype field, B8 forms a To DS field, B9 forms a From DS field, B10 forms a more frag field, B11 forms a retry field, B12 forms a power management field, B13 forms a more data field, B14 forms a protected frame field, and B15 forms an order field.

In an example, the type field is used to indicate the type for the frame 200. For example, when the type field has binary value "01", the frame 200 is a control frame; when the type field has binary value "00", the frame 200 is a management frame; when the type field has binary value "10", the frame 200 is a data frame.

Generally, the subtype field is used to indicate the subtype for the frame 200 when the frame is in the regular control frame format. For example, when the type field has binary value "01", and the subtype field has binary value "1101", the frame 200 is an ACK frame; when the type field has binary value "01", and the subtype field has binary value "1011", the frame 200 is an RTS frame. In an embodiment, a value that is predefined as an indicator for the extended control frame format is filled in the subtype field to indicate the extended control frame format. In the example, the extended subtype field 250 has a value corresponding to the extended subtype of the control frame.

In the FIG. 2 example, when the type field has binary value "01", the bits B8-B11 have binary value "0000".

In an embodiment, when the extended subtype field 250 has a value corresponding to EFTM request frame, the control information field 260 includes various subfield to deliver various control information for EFTM request frame, such as a dialog token field 261, a bandwidth field 262, an ENDP type field 263, a feedback type field 264, channel state parameters field 265, and the like. In an example, the dialog token field 261 includes a value identifying the present range measurement, and the bandwidth field 262 has a value corresponding to the bandwidth of the TXOP. Further, in the example, the ENDP type field 263 has a value defining requested type of ENDP, such as very high throughput (VHT) type according to VHT WLAN standard, high efficiency (HE) type according to HE WLAN standard, and the like, and the feedback type field 264 defines the feedback type, such as timestamp feedback, channel state feedback and the like. The channel state parameters field 265 defines the parameters of the channel state feedback. It is noted that the control information field 260 can include other suitable subfields (not shown), such as an EFTM capability field, a data rate/modulation coding scheme field, and the like.

In another embodiment, when the extended subtype field 250 has a value corresponding to EFTM response frame, the control information field 260 includes various subfield to deliver various control information for EFTM response frame, such as a dialog token field 261, a bandwidth field 262, an ENDP type field 263, a feedback type field 264, and channel state parameters field 265 in the EFTM request frame. In an example, the dialog token field 261 includes a value copied from a corresponding EFTM request frame, and the bandwidth field 262 has a value corresponding to a negotiated bandwidth of the TXOP. Further, the ENDP type field 263 has a value defining a negotiated type of ENDP, and the feedback type field 264 defines a negotiated feedback type. The channel state parameters field 265 defines the negotiated parameters of the channel state feedback. It is noted that the control information field 260 can include other suitable subfields (not shown), such as an EFTM capability field, a status field for indicating whether an EFTM request has been accepted or reason of rejection.

Figure 3:
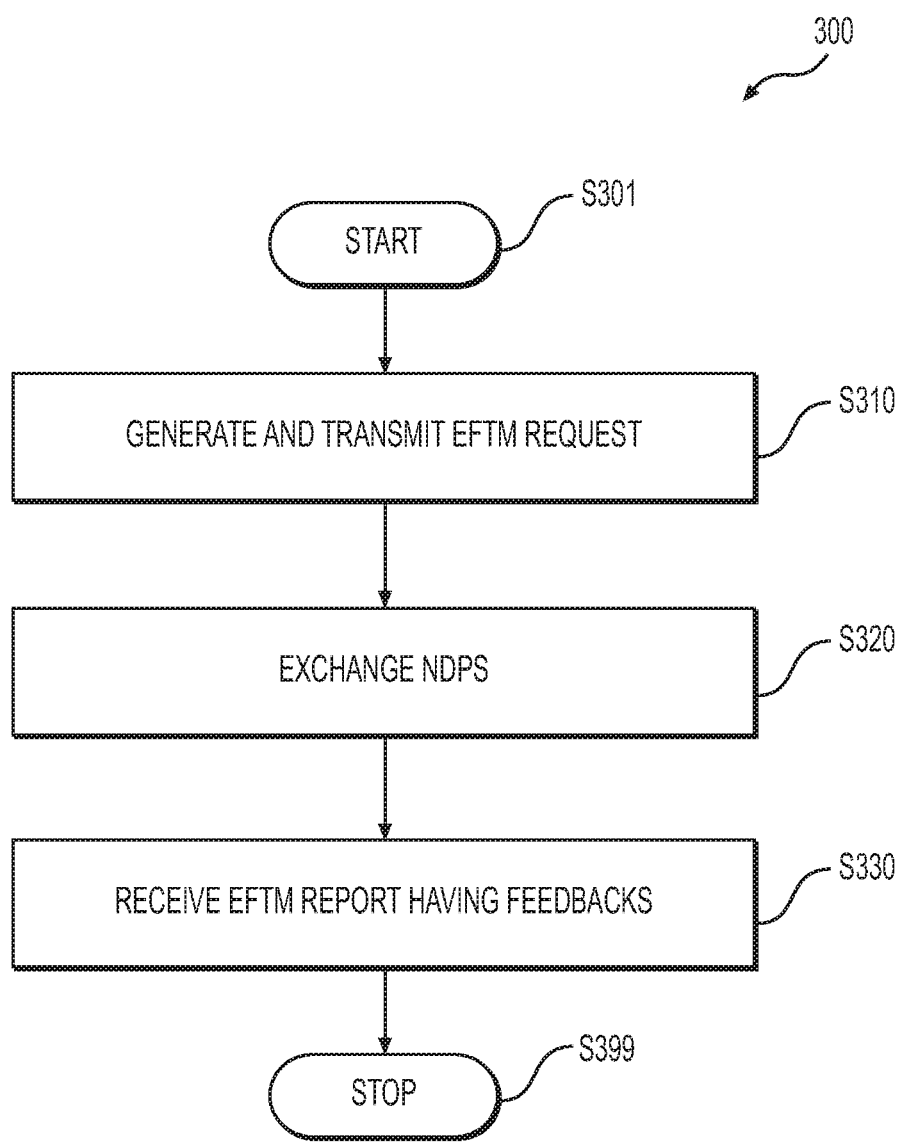
FIG. 3 shows a flow chart outlining a process example 300 according to an embodiment of the disclosure.

FIG. 3 shows a flow chart outlining a process example 300 for a range measurement according to an embodiment of the disclosure. In an example, the process is executed by an initiating electronic device in a range measurement, such as the first electronic device 110 in the FIG. 1A example to perform the range measurement to a responding electronic device, such as the second electronic device 160. The process starts at S301, and proceeds to S310.

At S310, an EFTM request is generated and transmitted. In the FIG. 1A example, when a TXOP is granted to the first electronic device 110, the EFTM controller 130 generates an EFTM request frame using the extended control frame format to indicate the EFTM based range measurement. The transmitting circuit 115 transmits a wireless signal carrying the EFTM request frame to start the EFTM based range measurement.

At S320, NDPs are exchanged between the initiating electronic device and a responding electronic device. In an example, the first electronic device 110 transmits a first NDP to the second electronic device 160, and waits to receive a second NDP that is transmitted by the second electronic device 160. In another example, the first electronic device 110 waits to receive a first NDP that is transmitted by the second electronic device 160, and in response to the reception of the first NDP, the first electronic device 110 transmits a second NDP to the second electronic device 160. The first electronic device 110 suitable records timing information for the NDPs, such as a departure time for the NDP transmission, an arrival time for the NDP reception, and the like.

At S330, an EFTM report with feedbacks is received. In an example, the second electronic device 160 also records timing information for the exchange of the NPDs. The second electronic device 160 generates an EFTM report that includes the recorded timing information for the exchange of the NPDs at the second electronic device 160, and then the second electronic device 160 transmits a wireless signal carrying the EFTM report. The first electronic device 110 receives the EFTM report, and extracts the timing information for the exchange of the NPDs at the second electronic device 160, and combines the timing information for the exchange of the NPDs at the second electronic device 160 with the timing information for the exchange of the NPDs at the first electronic device 110 to determine a round trip time. In an example, based on the round trip time, a distance between the first electronic device 110 and the second electronic device 160 can be determined. Then the process proceeds to S399 and terminates.

It is noted that the process 300 can be suitably modified. In an example, the first electronic device 110 receives an EFTM response before the exchange of the NDPs.

Figure 4:
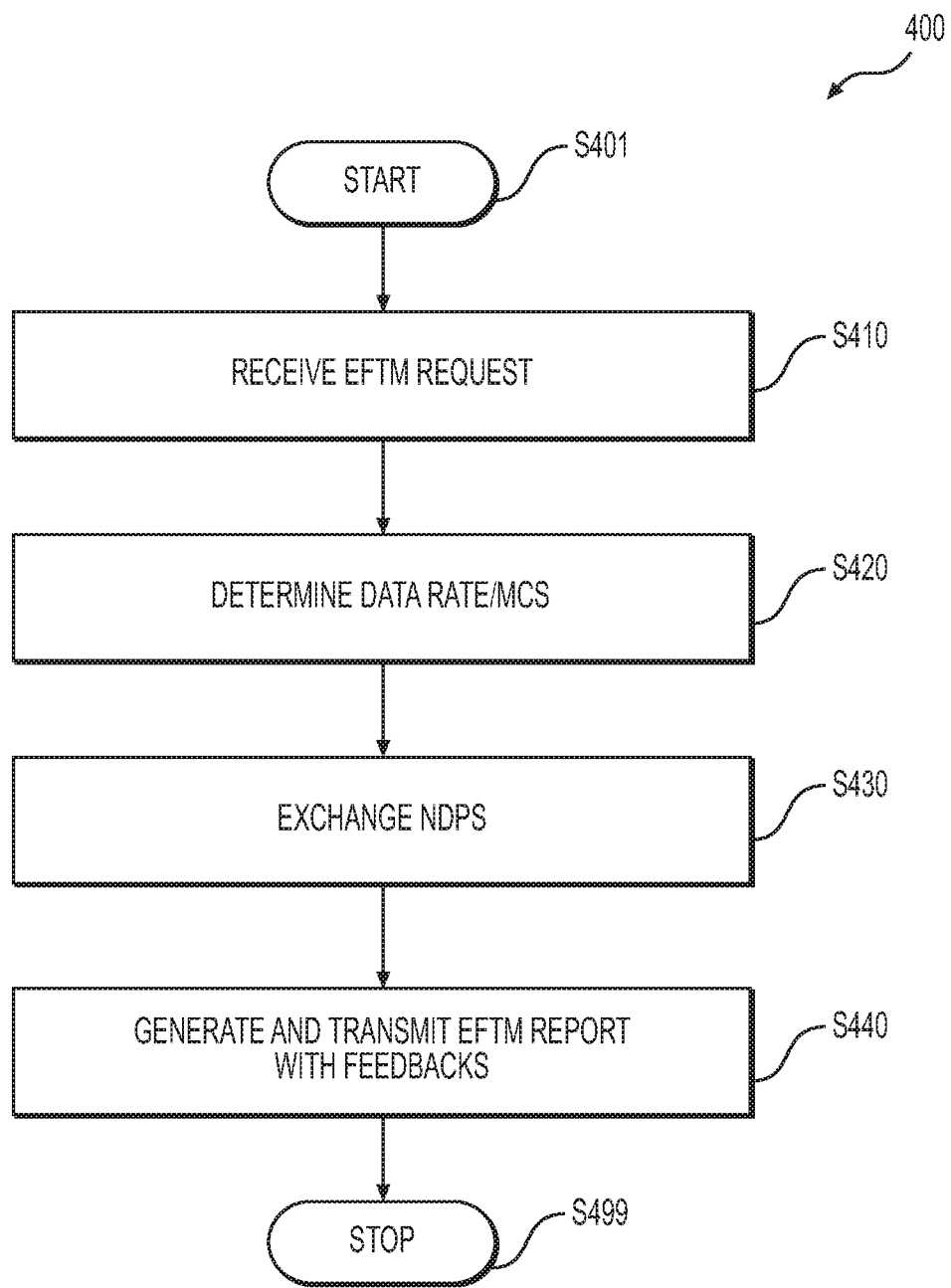
FIG. 4 shows a flow chart outlining a process example 400 according to an embodiment of the disclosure.

FIG. 4 shows a flow chart outlining a process example 400 for a range measurement according to an embodiment of the disclosure. In an example, the process 400 is executed by a responding electronic device in a range measurement, such as the second electronic device 160 in the FIG. 1A example to assist an initiating electronic device, such as the first electronic device 110, to perform the range measurement in a TXOP. The process starts at S401, and proceeds to S410.

At S410, an EFTM request is received. In the FIG. 1A example, the EFTM controller 130 generates an EFTM request frame using the extended control frame format to indicate the EFTM based range measurement. The transmitting circuit 115 transmits a wireless signal carrying the EFTM request frame to start the EFTM based range measurement. In the example, when the second electronic device 160 receives the wireless signal carrying the EFTM request frame, the receiving circuit 166 constructs a frame in response to the wireless signal, and provides the frame to the processing circuit 170. In an example, the EFTM controller 190 detects that the frame is in the extended control frame format, and parses the frame accordingly. For example, the EFTM controller 190 detects a value in a subtype field that is indicative of the EFTM request subtype under the control type, thus the frame is an EFTM request frame.

At S420, a data rate/MCS is determined. In an example, the EFTM request frame indicates a requested BW, data rate/MCS, and the second electronic device 160 extracts the requested BW, data rate/MCS and determine to use the requested data rate/MCS for transmissions in the TXOP. In another example, the second electronic device 160 detects the BW, date rate/MCS that are used for the transmission of the EFTM request frame, and determines to use the detected BW, data rate/MCS. In another example, the second electronic device 160 determines the BW, data rate/MCS independent of the EFTM request frame.

At S430, NDPs are exchanged between the initiating electronic device and the responding electronic device. In an example, the first electronic device 110 transmits a first NDP to the second electronic device 160, and waits to receive a second NDP that is transmitted by the second electronic device 160. In another example, the first electronic device 110 waits to receive a first NDP that is transmitted by the second electronic device, and in response to the reception of the first NDP, the first electronic device 110 transmits a second NDP to the second electronic device 160. The second electronic device 160 suitable records timing information for the NDPs, such as a departure time for the NDP transmission, an arrival time for the NDP reception, and the like.

At S440, an EFTM report is generated and transmitted. In an example, the second electronic device 160 generates an EFTM report that includes the recorded timing information for the exchange of the NPDs at the second electronic device 160, and then the second electronic device 160 transmits a wireless signal carrying the EFTM report. When the first electronic device 110 receives the wireless signal, the first electronic device 110 extracts the timing information for the exchange of the NPDs at the second electronic device 160. Then the first electronic device 110 combines the timing information for the exchange of the NPDs at the second electronic device 160 with the timing information for the exchange of the NPDs at the first electronic device 110 to determine a round trip time. In an example, based on the round trip time, a distance between the first electronic device 110 and the second electronic device 160 can be determined. Then the process proceeds to S499 and terminates.

Figure 5:
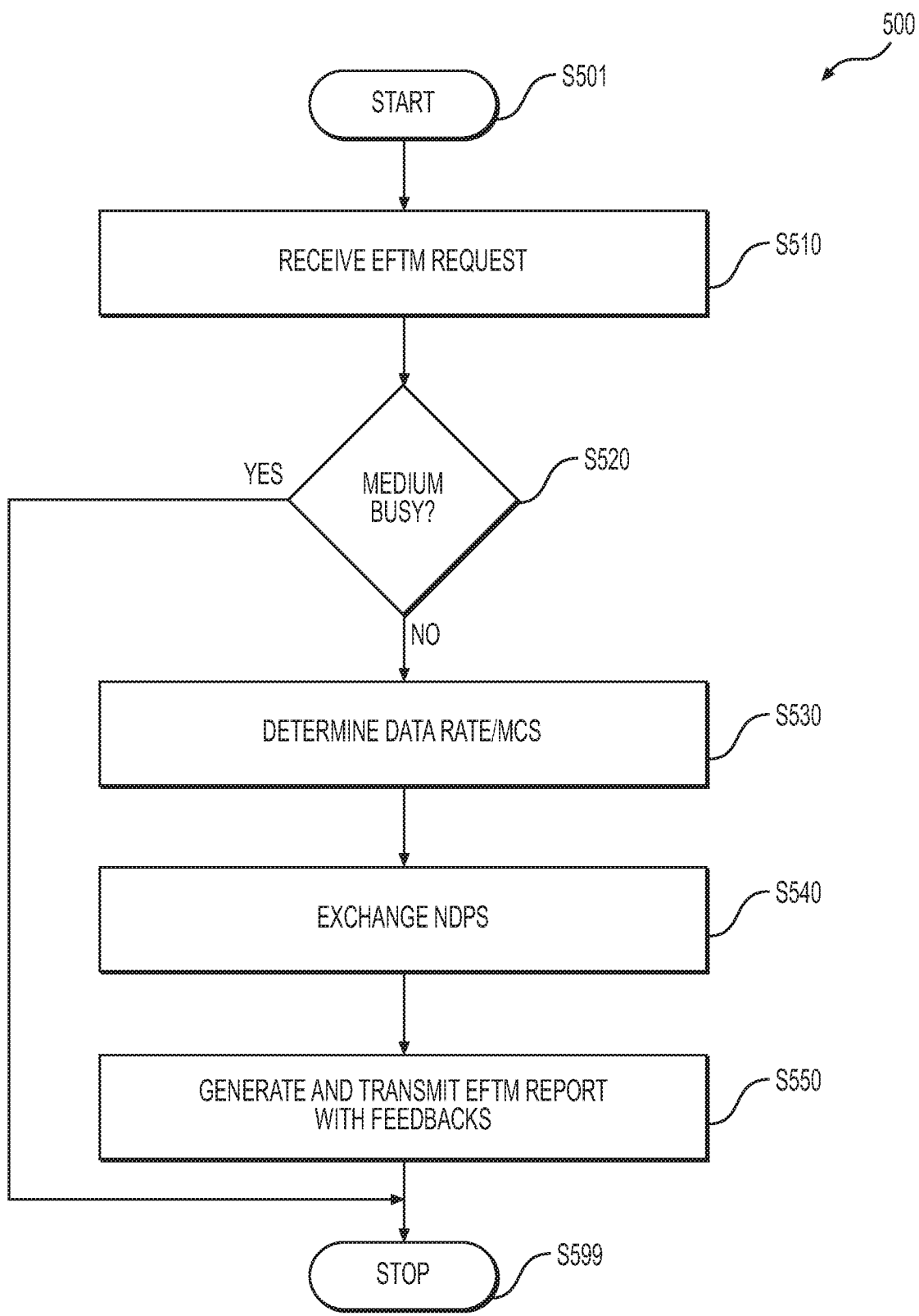
FIG. 5 shows a flow chart outlining a process example 500 according to an embodiment of the disclosure.

FIG. 5 shows a flow chart outlining a process example 500 for a range measurement according to an embodiment of the disclosure. In an example, the process is executed by a responding electronic device in a range measurement, such as the second electronic device 160 in the FIG. 1A example to assist an initiating electronic device, such as the first electronic device 110, to perform the range measurement in a TXOP. The process starts at S501, and proceeds to S510.

At S510, an EFTM request is received. In the FIG. 1A example, the EFTM controller 130 generates an EFTM request frame using the extended control frame format to indicate the EFTM based range measurement. The transmitting circuit 115 transmits a wireless signal carrying the EFTM request frame to start the EFTM based range measurement. In the example, when the second electronic device 160 receives the wireless signal carrying the EFTM request frame, the receiving circuit 166 constructs a frame in response to the wireless signal, and provides the frame to the processing circuit 170. In an example, the EFTM controller 190 detects that the frame is in the extended control frame format, and parses the frame accordingly. For example, the EFTM controller 190 detects a value in a subtype field that is indicative of the EFTM request subtype under the control type, thus the frame is an EFTM request frame.

At S520, medium busy/idle status is detected. In an example, the second electronic device 120 checks the wireless medium and the network allocation vector (NAV) that represents amount of time to defer in accessing the medium. When the NAV has zero value and the wireless medium is physical idle, the second electronic device 120 determines that the medium is idle. When the medium is busy, the process proceeds to S599 and terminates. When the medium is idle, the process proceeds to S530.

At S530, the BW, data rate/MCS and PPDU format are determined. In an example, the EFTM request frame indicates a requested BW, data rate/MCS, and PPDU format, and the second electronic device 160 extracts the requested data BW, rate/MCS and determine to use the requested BW, data rate/MCS, and PPDU format for transmissions in the TXOP. In another example, the second electronic device 160 detects the BW, date rate/MCS and PPDU format that are used for the transmission of the EFTM request frame, and determines to use the detected BW, data rate/MCS, and PPDU format. In another example, the second electronic device 160 determines the BW, data rate/MCS, and PPDU format independent of the EFTM request frame.

At S540, NDPs are exchanged between the initiating electronic device and a responding electronic device. In an example, the second electronic device 160 transmits a first NDP to the first electronic device 110, and waits to receive a second NDP that is transmitted by the first electronic device 110 in response to the first NDP. The second electronic device 160 suitable records timing information for the NDPs, such as a departure time for the NDP transmission, an arrival time for the NDP reception, and the like.

At S550, an EFTM report is generated and transmitted. In an example, the second electronic device 160 generates an EFTM report that includes the recorded timing information for the exchange of the NPDs at the second electronic device 160, and then the second electronic device 160 transmits a wireless signal carrying the EFTM report. When the first electronic device 110 receives the wireless signal, the first electronic device 110 extracts the timing information for the exchange of the NPDs at the second electronic device 160. Then the first electronic device 110 combines the timing information for the exchanges of the NPDs at the second electronic device 160 with the timing information for the exchange of the NPDs at the first electronic device 110 to determine a round trip time. In an example, based on the round trip time, a distance between the first electronic device 110 and the second electronic device 160 can be determined. Then the process proceeds to S599 and terminates.

It is noted that the process 500 can be suitably modified. In an example, the first electronic device 110 sends a first NPD following the EFTM request to the second electronic device 160. When the second electronic device 160 receives the first NPD, the second electronic device 160 detects the medium busy/idle status after the reception of the first NPD. When the medium is idle, the second electronic device 160 sends a second NPD and the EFTM report to the first electronic device 110.

When implemented in hardware, the hardware may comprise one or more of discrete components, an integrated circuit, an application-specific integrated circuit (ASIC), etc.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
a transceiver circuit configured to transmit and receive wireless signals; and
a processing circuit configured to:
generate, using an extended control frame format, a request frame to indicate an enhanced fine timing measurement (EFTM) based range measurement to a second apparatus and a bandwidth of a transmission opportunity (TXOP), wherein the EFTM based range measurement is to be performed during the TXOP;
cause the transceiver circuit to transmit, subsequent to the TXOP being granted to the apparatus, wireless signals carrying the request frame to start the EFTM based range measurement, wherein the EFTM based range measurement comprises an exchange of null data packets with the second apparatus during the TXOP; and
determine a round trip time based on departure and arrival timing information of the null data packets.

2. The apparatus of claim 1, wherein the processing circuit is configured to receive a report frame sent by the second apparatus, determine, based on the report frame, a departure time of a first null data packet and an arrival time of a second null data packet that are recorded by the second apparatus, and wherein the processing circuit is configured to determine the round trip time based on i) an arrival time of the first null data packet and a departure time of the second null data packet that are recorded by the apparatus and ii) the determined departure time of the first null data packet and the determined arrival time of the second null data packet.

3. The apparatus of claim 1, wherein the processing circuit is configured to generate the request frame that includes at least one of a dialog token with a value of a present range measurement, an indicator of feedback type, and channel state parameters.

4. The apparatus of claim 1, wherein:
the transceiver is configured to receive wireless signals carrying a response frame in response to the request frame;
the processing circuit is configured to detect a capability indicator for the EFTM based range measurement.

5. The apparatus of claim 1, wherein the processing circuit is configured to generate the request frame to indicate a data rate and/or modulation and coding scheme for the second apparatus to use.

6. The apparatus of claim 1, wherein the indicated bandwidth of the TXOP is negotiated between the apparatus and second apparatus.

7. The apparatus of claim 1, wherein the indicated bandwidth has a value corresponding to one or more of the bandwidth of the request frame and the null data packets.

8. An apparatus, comprising:
a transceiver circuit configured to transmit and receive wireless signals that carry datagrams; and
a processing circuit configured to:
parse a request frame received by the transceiver circuit during a transmit opportunity (TXOP), the request frame defined by an extended control frame format the request frame being configured to indicate an enhanced fine timing measurement (EFTM) based range measurement during the TXOP and a bandwidth of the TXOP, wherein the EFTM based range measurement is initiated by a second apparatus;
record a departure time of a first null data packet that is transmitted by the transceiver circuit and an arrival time of a second null data packet that is received by the transceiver circuit, wherein the first null packet is transmitted and the second null packet is received during the TXOP;
generate a report frame to include the departure time of the first null data packet and the arrival time of the second null data packet; and
cause the transceiver circuit to transmit the report frame to the second apparatus for the second apparatus during the TXOP to determine a round trip time based on the departure time of the first null data packet and the arrival time of the second null data packet.

9. The apparatus of claim 8, wherein:
the processing circuit is configured to generate a response frame in response to the request frame, the response frame including a capacity indicator for the EFTM based range measurement.

10. The apparatus of claim 8, wherein the processing circuit is configured to determine that a medium for the EFTM based range measurement is idle before causing the transceiver circuit to transmit wireless signals for the EFTM based range measurement.

11. The apparatus of claim 8, wherein the processing circuit is configured to cause the transceiver circuit to transmit wireless signals for the EFTM based range measurement without a medium idle detection.

12. The apparatus of claim 8, wherein the processing circuit is configured to determine at least one of a data rate, a modulation and coding scheme (MCS), and a data unit format:
according to an indicator in the request frame;
according to a data rate, an MCS and a data unit format that are used for the request frame; or
independent of the request frame.

13. The apparatus of claim 8, wherein the indicated bandwidth has a value corresponding to one or more of the bandwidth of the request frame, the null data packets, and the report frame.

14. A method for ranging, comprising:
generating, by an electronic device, using an extended control frame format, a request frame to indicate an enhanced fine timing measurement (EFTM) based range measurement to a second electronic device and a bandwidth of a transmission opportunity (TXOP), wherein the EFTM based range measurement is to be performed during the TXOP;
transmitting, subsequent to the TXOP being granted to the electronic device, wireless signals carrying the request frame to start the EFTM based range measurement, wherein the EFTM based range measurement comprises an exchange of null data packets with the second electronic device during the TXOP; and
determining a round trip time based on departure and arrival timing information of the null data packets.

15. The method of claim 14, wherein determining the round trip time based on the departure and arrival timing information of the null data packets further comprises:
receiving a report frame sent by the second electronic device;
determining, based on the report frame, a departure time of a first null data packet and an arrival time of a second null data packet that are recorded by the second electronic device; and
determining the round trip time based on an arrival time of the first null data packet and a departure time of the second null data packet that are recorded by the electronic device and the departure time of the first null data packet and the arrival time of the second null data packet.

16. The method of claim 14, wherein generating, by the electronic device, the request frame using the extended control frame format to indicate the EFTM based range measurement to the second electronic device further comprises:
including at least one of a dialog token with a value of a present range measurement, an indicator of feedback type, and channel state parameters in the request frame.

17. The method of claim 14, further comprising:
receiving wireless signals carrying a response frame in response to the request frame; and
detecting a capability indicator for the EFTM based range measurement in the response frame.

18. The method of claim 14, wherein generating, by the electronic device, the request frame using the extended control frame format to indicate the EFTM based range measurement to the second electronic device further comprises:
generating the request frame to indicate a data rate and/or modulation and coding scheme for the second electronic device to use.

19. A method for ranging, comprising:
receiving, at an electronic device during a transmit opportunity (TXOP), wireless signals carrying a request frame from a second electronic device;
parsing the request frame to identify an extended control frame format of the frame and an indication of an enhanced fine timing measurement (EFTM) based range measurement during the TXOP and a bandwidth of the TXOP, wherein the EFTM based range measurement is initiated by the second electronic device;
recording a departure time of a first null data packet that is transmitted by the electronic device and an arrival time of a second null data packet that is received by the electronic device during the TXOP;
generating a report frame to include the departure time of the first null data packet and the arrival time of the second null data packet; and
transmitting the report frame to the second electronic device for the second electronic device during the TXOP to determine a round trip time based on the departure time of the first null data packet and the arrival time of the second null data packet.

20. The method of claim 19, further comprising:
generating a response frame in response to the request frame, the response frame including a capacity indicator for the EFTM based range measurement.

21. The method of claim 19, further comprising:
determining that a medium for the EFTM based range measurement is idle before transmitting wireless signals for the EFTM based range measurement.

22. The method of claim 19, further comprising:
transmitting wireless signals for the EFTM based range measurement without a medium idle detection.

23. The method of claim 19, further comprising one of:
determining at least one of a data rate, a modulation and coding scheme (MCS), and a data unit format according to an indicator in the request frame;
determining at least one of a data rate, a modulation and coding scheme (MCS), and a data unit format according to a data rate, a modulation and coding scheme (MCS), and a data unit format that is used for the request frame; or
determining at least one of a data rate, a modulation and coding scheme (MCS), and a data unit format independent of the request frame.

\* \* \* \* \*